W. Pierpont.
Harvester Cutter.

No. 10258.

Patented Nov. 22 1853.

UNITED STATES PATENT OFFICE.

WILLIAM PIERPOINT, OF SALEM, NEW JERSEY.

IMPROVEMENT IN THE CUTTERS OF GRAIN AND GRASS HARVESTERS.

Specification forming part of Letters Patent No. 10,258, dated November 22, 1853.

*To all whom it may concern:*

Be it known that I, WILLIAM PIERPOINT, of Salem, in the county of Salem and State of New Jersey, have invented certain new and useful Improvements in Machines for Mowing and Reaping; and I do hereby declare that the following is a full, clear, and exact description thereof, reference being had to the accompanying drawings, in which—

Figure 1:
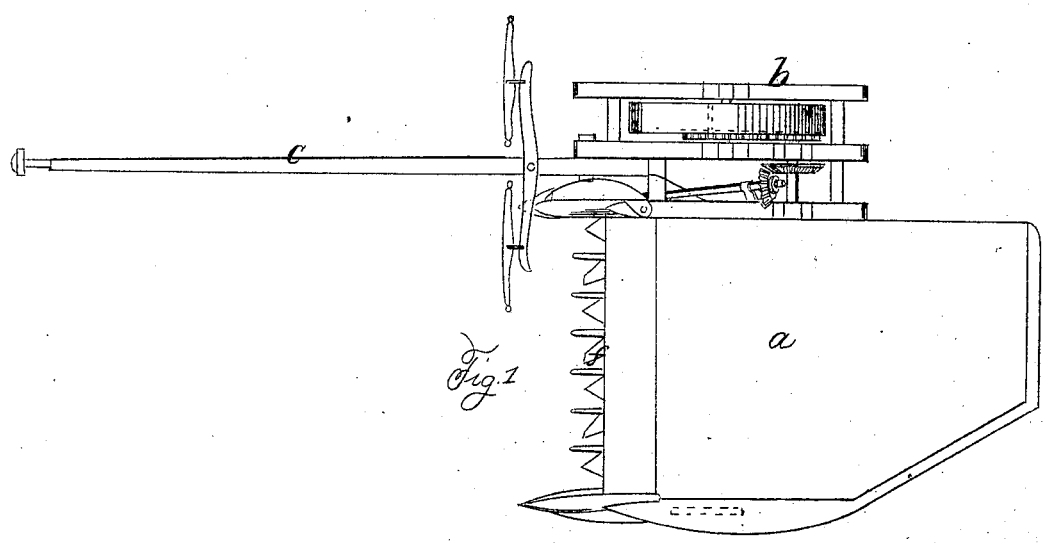
Figure 3:
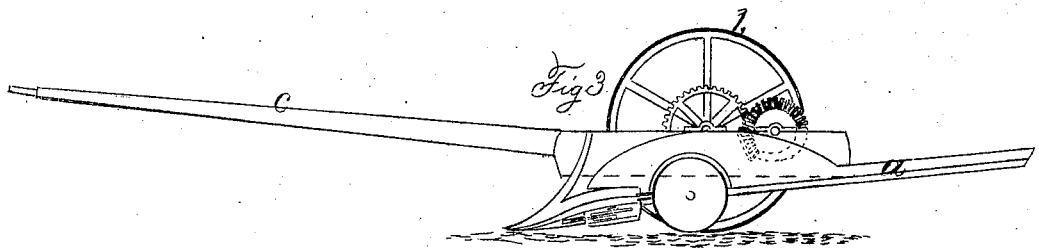
Figure 4:
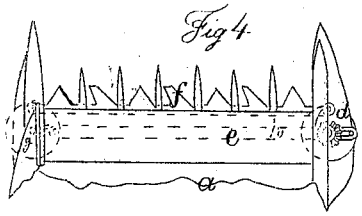
Figure 5:
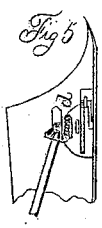
Figure 6:
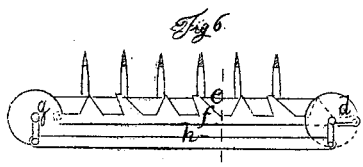
Figure 7:
Figure 2:
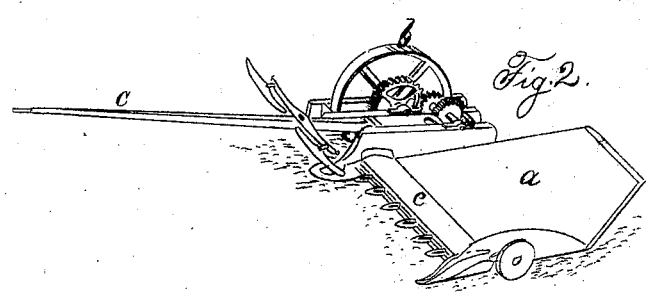

Figures 1 and 2 are general views. Figs. 3, 4, 5, 6, and 7 show sectional parts of the machine.

My improvements consist in the method of hanging and moving the cutters.

The construction is as follows: The platform upon which the grain or grass falls, together with the frame marked $a$ in the drawings, is similar to other mowing and reaping machines, there being but one large heavy carriage-wheel, $b$, in front of which, affixed to the frame, is the ordinary pole, $c$.

The wheel $b$ may be geared in any convenient way with a short upright double-crank shaft, $d$, (see Fig. 5,) located at one end of the finger-board $e$ and properly shielded from dust and stalks to prevent its clogging. To the lower crank of this shaft one end of a toothed cutter or sickle, $f$, is affixed, the other end being attached to the crank of a similar double-crank shaft, $g$, at the outer end of the finger-board. The upper cranks, which are much shorter than the lower ones with the cutters upon them, are united by a connecting-rod, $h$. They are at right angles to the lower cranks, and serve the purpose of securing the proper and uniform revolution of the two crank-shafts in unison with each other. When the inner crank-shaft is put in motion it causes the cutter to advance in a curvilinear direction, make a cut, and recede till it comes back to the starting-point, each portion of the cutter describing a circle of the same radius as crank, and cutting all the time one way, while in the return it is completely shielded, free from entanglement with the cut grass or grain, and is thus at all times prevented from clogging. I put a counter-balance upon the crank-shaft to give a uniform motion and perfect balance to the machine.

Having thus described my improvement, I make the following claim thereto:

Hanging the cutter-blade at each end to a crank, so as to cause the rotary draw cut in form of a circle, substantially as described, in combination with the counter-rod $h$, for insuring the perfect revolution of both shafts in unison.

WILLIAM PIERPOINT.

Witnesses:
THOMAS W. CATLETT,
EDWARD VAN METER.